(12) United States Patent
Hammarwall et al.

(10) Patent No.: US 10,014,920 B2
(45) Date of Patent: Jul. 3, 2018

(54) METHOD IN A NETWORK NODE, METHOD IN A USER EQUIPMENT, A NETWORK NODE AND A USER EQUIPMENT FOR SELECTING A BEAM CANDIDATE

(75) Inventors: David Hammarwall, Vallentuna (SE); Niklas Wernersson, Solna (SE)

(73) Assignee: TELEFONAKTIEBOLAGET LM ERICSSON (PUBL) (SE)

(*) Notice: Subject to any disclaimer, the term of this patent is extended or adjusted under 35 U.S.C. 154(b) by 124 days.

(21) Appl. No.: 14/427,255

(22) PCT Filed: Sep. 12, 2012

(86) PCT No.: PCT/SE2012/050959
§ 371 (c)(1),
(2), (4) Date: Mar. 10, 2015

(87) PCT Pub. No.: WO2014/042562
PCT Pub. Date: Mar. 20, 2014

(65) Prior Publication Data
US 2015/0236772 A1    Aug. 20, 2015

(51) Int. Cl.
*H04W 4/00* (2018.01)
*H04B 7/06* (2006.01)
(Continued)

(52) U.S. Cl.
CPC .......... *H04B 7/0617* (2013.01); *H04L 5/0048* (2013.01); *H04W 24/10* (2013.01); *H04W 72/042* (2013.01)

(58) Field of Classification Search
CPC .. H04B 7/0617; H04W 72/042; H04W 24/10; H04L 5/0048
See application file for complete search history.

(56) References Cited

U.S. PATENT DOCUMENTS 6,141,565 A * 10/2000 Feuerstein ............ H04W 16/06
                                                         455/422.1
6,453,177 B1 * 9/2002 Wong .................... H01Q 1/246
                                                          455/450
(Continued)

FOREIGN PATENT DOCUMENTS

CN      101594620 A     12/2009
EP      2 148 546 A1    1/2010
(Continued)

OTHER PUBLICATIONS

Extended European Search Report and Written Opinion dated Apr. 7, 2016 for EP Application Serial No. 1 288 4545.0-1874, Entry into EP Regional Phase: Mar. 13, 2015 consisting of 8-pages.
(Continued)

*Primary Examiner* — Ayaz Sheikh
*Assistant Examiner* — Hai-Chang Hsiung
(74) *Attorney, Agent, or Firm* — Christopher & Weisberg, PA (57) ABSTRACT

A method in a network node for selecting a beam candidate in a wireless communication network, including acquiring information including information indicative of signal qualities for multiple beam candidates; assigning to each of the multiple beam candidates a factor indicating signal interference generated by the corresponding beam candidate and selecting a beam candidate taking into account at least the associated signal quality and the factor assigned to the selected beam candidate.

24 Claims, 8 Drawing Sheets

(51) Int. Cl.
*H04W 72/04* (2009.01)
*H04L 5/00* (2006.01)
*H04W 24/10* (2009.01)

(56) References Cited

U.S. PATENT DOCUMENTS

| | | | |
|---|---|---|---|
| 2006/0094373 A1 | 5/2006 | Hottinen | |
| 2009/0086648 A1* | 4/2009 | Xu | H04B 7/0689 370/252 |
| 2009/0189812 A1 | 7/2009 | Xia et al. | |
| 2009/0201903 A1 | 8/2009 | Ghady et al. | |
| 2010/0189189 A1* | 7/2010 | Hoshino | H04B 7/0408 375/267 |
| 2010/0329369 A1 | 12/2010 | Hou et al. | |
| 2012/0082052 A1* | 4/2012 | Oteri | H04W 24/10 370/252 |
| 2012/0275322 A1* | 11/2012 | Ji | H04L 1/0027 370/252 |
| 2014/0099962 A1* | 4/2014 | Capdevielle | H04W 16/32 455/441 |

FOREIGN PATENT DOCUMENTS

| | | |
|---|---|---|
| EP | 2 175 573 A1 | 4/2010 |
| EP | 2612518 A1 | 4/2012 |
| WO | 2010025148 A1 | 3/2010 |
| WO | 2010/151701 A1 | 12/2010 |

OTHER PUBLICATIONS

International Search Report and Written Opinion dated Sep. 27, 2013 for International Application Serial No. PCT/SE2012/050959, International Filing Date: Sep. 12, 2012 consisting of 11-pages.
Chinese Office Action and Search Report and English translation thereof, dated May 3, 2017, issued by the State Intellectual Property Office, P.R. China in corresponding Chinese Application Serial No. 201280075754.2 , filed Sep. 12, 2012 and entitled Method in a Nework Node, Method in a User Equipment, a Network Node and a User Equipment for Selecting a Beam Candidate consisting of 29 pages.

* cited by examiner

METHOD IN A NETWORK NODE, METHOD IN A USER EQUIPMENT, A NETWORK NODE AND A USER EQUIPMENT FOR SELECTING A BEAM CANDIDATE

TECHNICAL FIELD

The present technology relates to interference mitigation in general and in particular it relates to methods and apparatuses, in terms of a network node and a user equipment, for selecting a beam candidate in a wireless communication network.

BACKGROUND

Figure 1A:
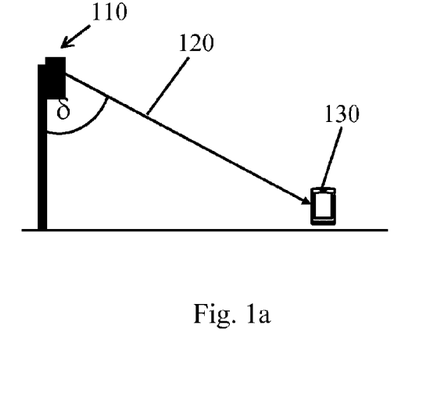
FIG. 1a depicts a beamformed signal sent out at a first elevation angle.
Figure 1B:
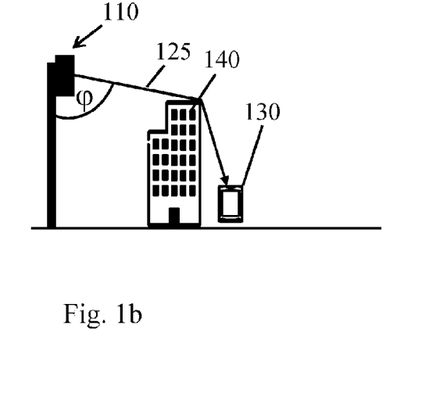
FIG. 1b depicts a beamformed signal sent out at a second elevation angle.

Radio propagation is the behavior of radio waves when they are transmitted, or propagated, from one point to another point. Radio waves will during their propagation be affected by several factors, such as e.g. reflection, diffraction, absorption and scattering, depending on the environment between the two points. Furthermore when transmitting from a network node 110, to a UE 130, the propagation may be along a direct line of sight path as illustrated in FIG. 1a, where a beam 120 is transmitted from a network node 110 to a UE 130 at an elevation angle δ. The propagation may also be along non-direct line of sight paths created for instance by reflections from different scatters. Non line of sight paths are crucial in any communication system that does not purely rely on line of sight transmissions, which is typically the case in urban areas. Another kind of effect that creates non-line of sight propagation is diffraction, illustrated in FIG. 1b which is the result of radio waves being bent around sharp edges, such as the beam 125 transmitted at the elevation angle φ over the building 140.

In general, when transmitting from the network node 110 to the UE 130, the radio propagation is not only along a single distinct path between the network node 110 to the UE 130, but rather along a set of paths, corresponding to a multipath propagation environment. These paths may correspond to different delays, spatial directions, and constitute different receive powers etc. More generally speaking, there is typically a continuum of paths that is dominated by certain primary directions.

Figure 2:
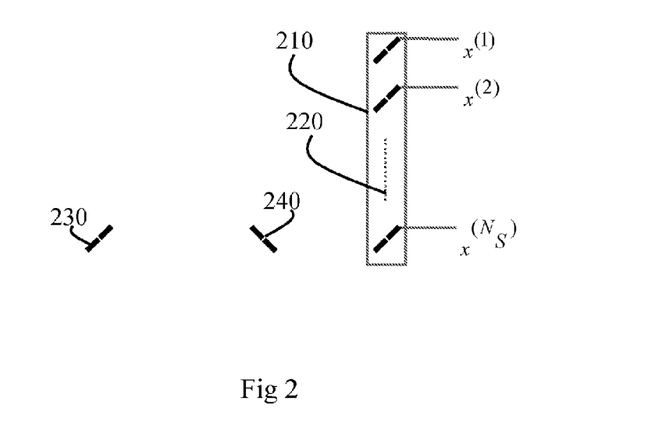
FIG. 2 depicts an antenna element together with a number of polarization elements.

Beamforming is a technique for directional signal transmission and/or reception. This is achieved by controlling the phase and amplitude of different signals transmitted from and/or received at spatially separated antenna elements e.g., oriented as a linear array, or vertically as the sub-elements of an active antenna. See for example the active antenna 210 in FIG. 2 and the example antenna subelements 230 and 240 producing signals having different polarizations.

In the case that the active antenna is mounted in such a way that antenna subelements are spread out on a vertical axis, one possible beamforming technique is "elevation beamforming" meaning that the transmitted and/or received signal is directed in the elevation domain. See the active antenna 210 in FIG. 2 with the active elements $x^{(1)} \ldots x^{(NS)}$ vertically arranged along the vertical antenna axis 220. Beamforming in this configuration is achieved using different phases and amplitudes for the different subelements of the active antenna such that at certain angles, relative the active antenna, the different signals experience constructive interference whereas at other angles they experience destructive interference.

Figure 3A:
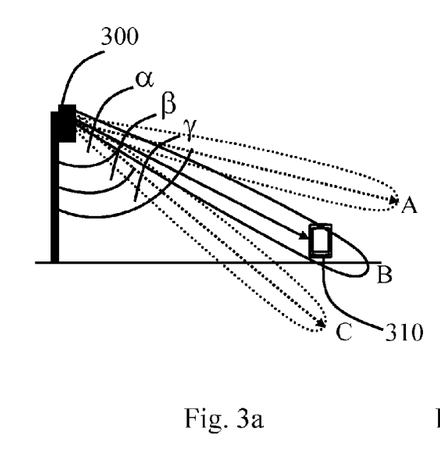
FIG. 3a depicts a network node transmitting signals on different beams in the elevation domain.

One example of beamforming in the case of transmission is illustrated in FIG. 3a. As can be seen the network node 300 is able to dynamically direct its transmitted energy into three different directions; that is, beams, A-C. Furthermore, when the network node 300 is transmitting to the illustrated UE 310 the choice of using beam B has the advantage that the transmitted energy will be directed in the same direction as the direct propagation path between the network node 300 and the UE 310. This has the effect that the UE 310 receives a stronger signal from the network node 300. In the case that there were no dynamic elevation beamforming the network node 300 would instead need to use the same beam for all transmission and therefore not be able to dynamically focus the transmitted power in the direction towards its UE 310 of interest.

Figure 3B:
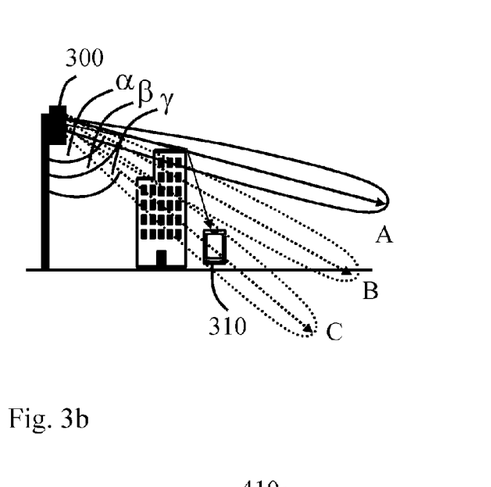
FIG. 3b depicts the same network node transmitting signals on the same three beams in the elevation domain in the presence of obstacles.

In FIG. 3b it is illustrated that the suitable direction for transmission is not necessarily the same as the direction that would correspond to the line of sight direction between the network node 300 and the UE 310. Here, transmission using beam A at an elevation angle α maximizes the received power at the UE 310, since it coincides with the direction of the propagation path from the network node 300 to the UE 310. If beams B or C with the elevation angels β or γ were used for transmission, the result would likely be a lower received power at the UE 310.

It should be emphasized that in a more general setting there may be any number of beams. In fact, the used beams may even be created dynamically pointing in an arbitrary elevation direction and with an arbitrary shape (e.g., width) implying an infinite number of possible beams.

The signal quality achieved with a given beam may be acquired or estimated by the network node in many ways, including power measurements in the uplink based on sounding signals from a UE or from feedback from a UE that, for example, measures received power of a set of reference signals transmitted by the network node. This beamforming technique applied in the elevation domain may be called dynamic elevation beamforming. The network node may also determine the signal quality for the beam candidates from data or control transmissions made by the UE in the uplink.

Although dynamic elevation beamforming is a powerful tool for directing the transmitted energy towards the UE of interest and may potentially increase the signal to noise ratio at one or more UEs in one cell, it may do so at the expense of lowering the signal to noise ratio in other UEs in neighboring cells due to interference created by the beams.

SUMMARY

It is an object of the present technology to obviate at least some of the disadvantages associated with previously known technology and this to provide an improved method in a network node, in a UE, a network node and a UE for selecting a beam candidate in a wireless communication network.

According to an aspect of the present technology the solution is a method in a network node for selecting a beam candidate in a wireless communication network, comprising: acquiring information comprising information indicative of signal qualities for a plurality of beam candidates; a signal quality relating to a link performance for at least one signal; assigning to each of the plurality of beam candidates a factor indicating signal interference generated by the corresponding beam candidate; and selecting a beam candidate for downlink transmission to a UE, the selected beam candidate being selected taking into account at least said associated signal quality and the factor assigned to the selected beam candidate.

An advantage of the above aspect is that it will achieve a satisfactory signal quality for a selected beam while at the same time limiting the interference to UEs located in neighboring cells. Hence, the overall signal quality in the wireless communication network will be increased.

According to another aspect of the present technology, the solution is a method in a UE for selecting a beam candidate in a wireless communication system, comprising: receiving, from a network node, at least one signal transmitted by the network node using one of a plurality of beam candidates; determining information comprising information indicative of signal quality for the plurality of the beam candidates; the signal quality relating to a link performance for said at least one signal; assigning to each beam candidate, a factor indicating signal interference generated by the corresponding beam candidate; selecting a beam candidate among the plurality of beam candidates, the selected beam candidate being selected taking into account at least said associated signal quality and the factor assigned to the selected beam candidate; and transmitting to said network node, information comprising information indicative of the selected beam candidate.

An advantage of this aspect is that it relieves the network node of the computation work for determining the optimum beam candidate for transmissions in case a large number of UEs are present in the cell served by the network node.

According yet another aspect of the present technology, the solution is a network node for selecting a beam in a wireless communication network, comprising:

a transmitter configured to transmit to a UE, at least one signal using a plurality of beam candidates; a processing unit configured to acquire information comprising information indicative of signal quality for the plurality of the beam candidates; the signal quality relating to a link performance for said at least one transmitted signal; the processing unit is further configured to assign to each beam candidate, a factor indicating signal interference generated by the corresponding beam candidate, and; the processing unit is further configured to select a beam candidate among the plurality if beam candidates, for downlink transmission to the UE, the selected beam candidate being selected taking into account at least said associated signal quality and the factor assigned to the selected beam candidate.

Similar to the first aspect of the technology, the advantage of this aspect is that the network node will select only those beams for transmission to one or more UEs which offer acceptable signal quality at the corresponding UE(s), but which generate a low amount of interference to UEs in geographical areas served by other network nodes According to a yet another aspect of the present technology, the solution is a UE for selecting a beam candidate in a wireless communication system, comprising: a receiver configured to receive at least one signal on one of a plurality of beam candidates; a transmitter; a processing unit configured to determine information comprising information indicative of signal quality for the plurality of beam candidates; the signal quality relating to a link performance for said at least one signal; the processing unit further being configured to assign to each beam candidate a factor indicating signal interference generated by the corresponding beam candidate; the processing unit further being configured to determine an index identifying a reference signal associated with a beam candidate by taking into account at least said associated signal quality and the factor assigned to the corresponding beam candidate; and the processing unit further being configured to instruct the transmitter to transmit the index to a network node As mentioned earlier in the paragraph relating to advantages of the other aspect of the present technology, the advantage of a UE according to this aspect of the present technology is that it relieves the network node of the computation work for determining the beam candidate for transmissions in case a large number of UEs are present in the geographical area served by the network node.

These and other advantages will become more apparent by studying the detailed description of this technology.

DETAILED DESCRIPTION

When reading the description below it should be borne in mind that the embodiments listed and elaborated below serve only as examples and should not be construed as limiting the technology to these embodiments only. In fact, wireless systems, including, LTE, WCDMA, WiMax, UMB and GSM, may also benefit from exploiting the ideas covered within this technology.

Also note that terminology such as network node and user equipment (UE) should not be construed as implying a certain hierarchical relation between the two devices. In general, a network node could be considered as device 1 and "UE" as device 2 whereby the two devices communicate with each other over some radio channel.

Figure 4:
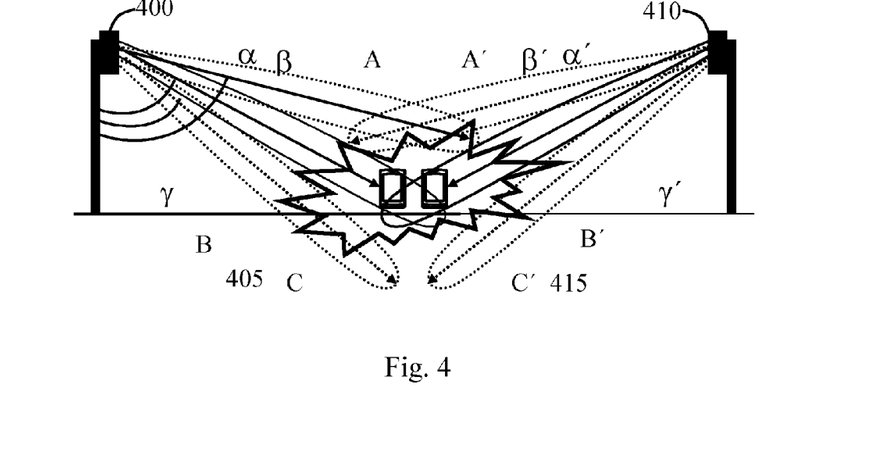
FIG. 4 depicts two network nodes transmitting signals on three different beams in the elevation domain where one of the beams creates interference.

As stated earlier, while potentially beneficial in increasing data throughput in a cell, beamforming may have negative effects on data throughput in neighboring cells due to interference. Hence, in order to maximize system performance (not just the performance of one cell), one needs to take the impact of interference on system performance into consideration. Note that in this context a cell is interpreted to mean the coverage area of a specific sector/area that is covered by an antenna (array) connected to a network node. This is illustrated in FIG. 4. When a network node 400 directs its transmitted power towards its UE 405 of interest it may at the same time also direct the transmitted energy towards another UE 415 currently receiving a signal from another network node 410. Hence, network nodes 400, 410 may cause interference to their neighboring cells when performing dynamic elevation beamforming. As can be seen from FIG. 4, the beams causing the most interference are beams B and B' transmitted at elevation angles β and β'. This interference may be very harmful for the system. In fact, it is possible that the entire gain obtained by increasing the received signal level disappears due to a simultaneous increase in interference. Beams C and C' transmitted at elevation angles γ, γ' are much less likely to cause any substantial interference to UEs in neighboring cells, whereas beams A and A' transmitted at angles α, α' will direct substantial energy deep into the neighboring cell and thereby likely cause substantial interference, while at the same time not provide good signal quality at the intended UEs.

Figure 5:
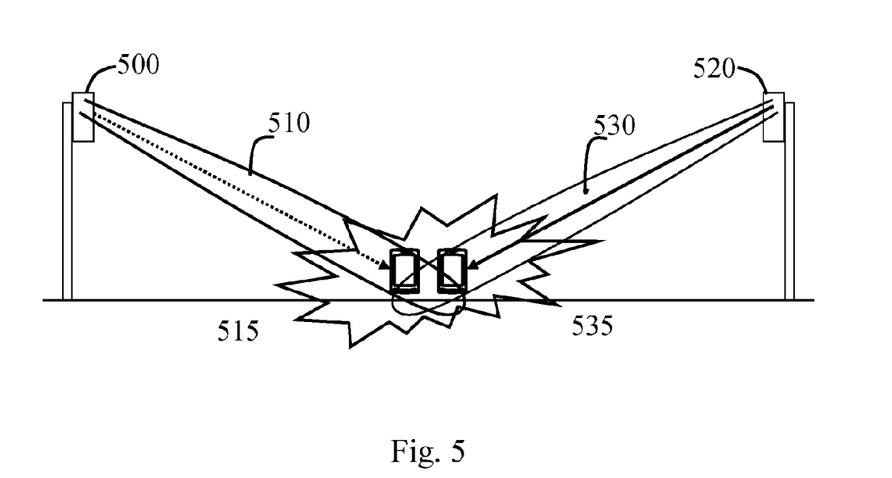
FIG. 5 depicts a network node transmitting a signal on a beam in the elevation domain creating interference to a beam sent from another network node.

In FIG. 5 it is illustrated that the effect of interference not only exists when network nodes 500 and 520 are performing elevation beamforming dynamically, but that the effect will always be present also in systems where the network nodes use static elevation beam candidates, such as the beam candidates 510 and 530.

In this description prior knowledge about expected caused interference corresponding to using a certain beam candidate direction will be used. For instance, when performing dynamic elevation beamforming it may be shown that more downtilted beam candidates tend to cause substantially less interference to other UEs in the system (e.g., UEs outside of the present network nodes control), than more up-tilted beam candidates (this is particularly the case in urban deployments with above rooftop propagation). Hence, by dynamically taking the increased interference level into account, the network node may operate to avoid up-tilted elevation beam candidates, whenever a more downtilted beam candidate provides satisfying signal quality to the target UE.

Figure 6:
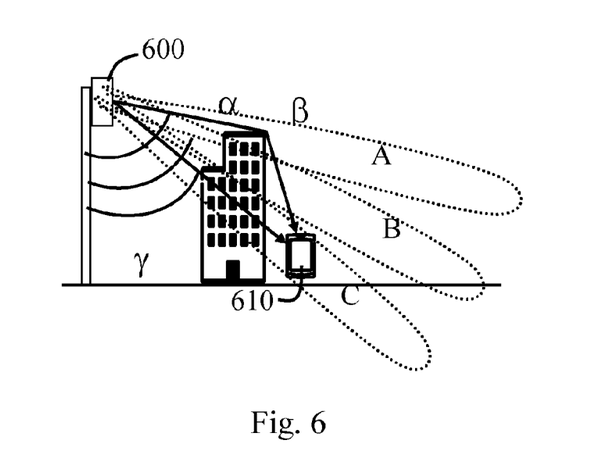
FIG. 6 depicts a network node transmitting signals on three different beams in the elevation domain in the presence of an obstacle.

Usually, not only one propagation path from a network node to a UE exists, but rather multiple paths over which transmitted energy will propagate. This is illustrated in FIG. 6 where two beam candidates A, C transmitted by a network node 600 at elevation angles α, γ will reach the UE 610—one over a roof top and one that propagates along the line of sight direction. Hence, in this typical situation there will be at least two incoming signals to the UE 610 at different elevation angles α, β. The third beam candidate, B, transmitted with the elevation angle β will most likely not reach the UE 610. Using known technology, the network node 600 would determine which of the three beam candidates is the most beneficial to use by trying to maximize the received signal level for the UE 610 in order to maximize the signal to noise level.

Figure 7:
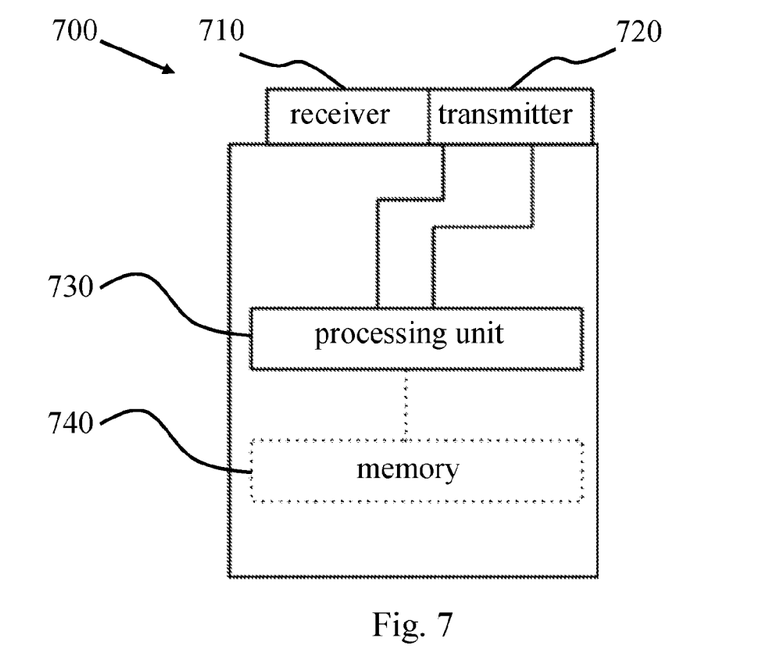
FIG. 7 shows one example embodiment of a UE according to the present technology.

FIG. 7 illustrates a UE according to one exemplary embodiment of the present technology. Features of the UE not related to the present technology have been omitted. The UE 700 in FIG. 7 comprises a receiver 710 and a transmitter 720, a processing unit 730 and an optional memory 740 illustrated by a dotted line.

Using the receiver 710, the user UE 700 is configured to receive one or a plurality of signals transmitted by a network node (not shown) on one or a plurality of beam candidates, i.e. beams on which the UE 700 may potentially receive data or control information from the network node. We assume that the network node from which the UE 700 has received the signals on beam candidates is serving the cell to which the UE 700 is currently assigned and that the beams are transmitted in the elevation domain by the network node. The receiver 710 of the UE 700 is also configured to receive configuration signals from the above network node instructing the UE 700 to issue a recommendation for the network node about which beam candidate to select for downlink transmission.

Moreover, using the transmitter 720 the UE 700 is adapted to transmit signal quality reports to the network node, where the channel quality reports comprise information on the interference generated by signals transmitted on various beam candidates. The processing unit 730 of the UE 700 is adapted to receive signals on beam candidates (transmitted in the elevation domain at different elevation angles or in the azimuth domain at different azimuth angles) via the receiver 710 and measure the signal quality associated with them. The signal quality measured may be the received signal strength, signal-to-noise ratio or some other parameter relating to signal quality for the received signals. For example, if the UE 700 via the receiver 710 receives reference signals from the network node, where each reference signal is transmitted using a specific beam candidate, then the processing unit 730 of the UE 700 when performing channel measurements based on a specific reference signal will effectively measure the combined effect of the beamforming (applied to the reference signal) and the effects of the radio propagation channel. Hence, each reference signal received is associated with an effective channel including both the beamforming effect and the radio propagation environment. Thus there is a one-to-one mapping between a specific reference signal, a specific beam candidate, and a specific effective channel. Hence by configuring the UE 700, to measure on the reference signals, it will be able to assess the quality of the effective channels (and thus also implicitly on the associated beam candidates) excited by the reference signals received by the UE 700 from the network node.

Also, the processing unit 730 may via the receiver 710 receive configuration data from a network node and, based on the configuration data, determine signal qualities associated with each received beam candidate and also assign a factor to each beam candidate, where the factor is related to the interference generated by each beam candidate. By for example receiving configuration information from an network node indicating to the UE 700 which factors related to interference to apply to each of the effective channels (i.e., each of the associated signal quality assessments), the processing unit 730 of the UE 700 may, taking the signal quality assessments and the factors into account, select one of the effective channels as recommended channels (and implicitly the associated beam candidate), and instruct the transmitter 720 to transmit the recommended effective channel to the network node. The network node may from the effective channel transmitted by the UE 700 follow the recommendation by the UE 700 and select the associated beam candidate for downlink information transmission and transmit on it.

The processing unit 730 of the UE 700 may apply any of the principles described in the embodiments in FIGS. 9 (adapted for execution in the UE) and 10 further below for taking the signal quality assessments and factors related to interference into account in determining the recommended effective channel (or index thereof). This includes soft interference mitigation. In this case the UE 700 will be the receiver and the network node the transmitter. Moreover, the UE 700 may in addition to reporting an index identifying the recommended effective channel (i.e., the recommended beam candidate) also report a more complete channel state information for the particular recommended effective channel. This will provide sufficient information to the network to perform accurate link adaptation, beamforming (in e.g., elevation domain) and precoding (in e.g., azimuth domain).

Figure 8:
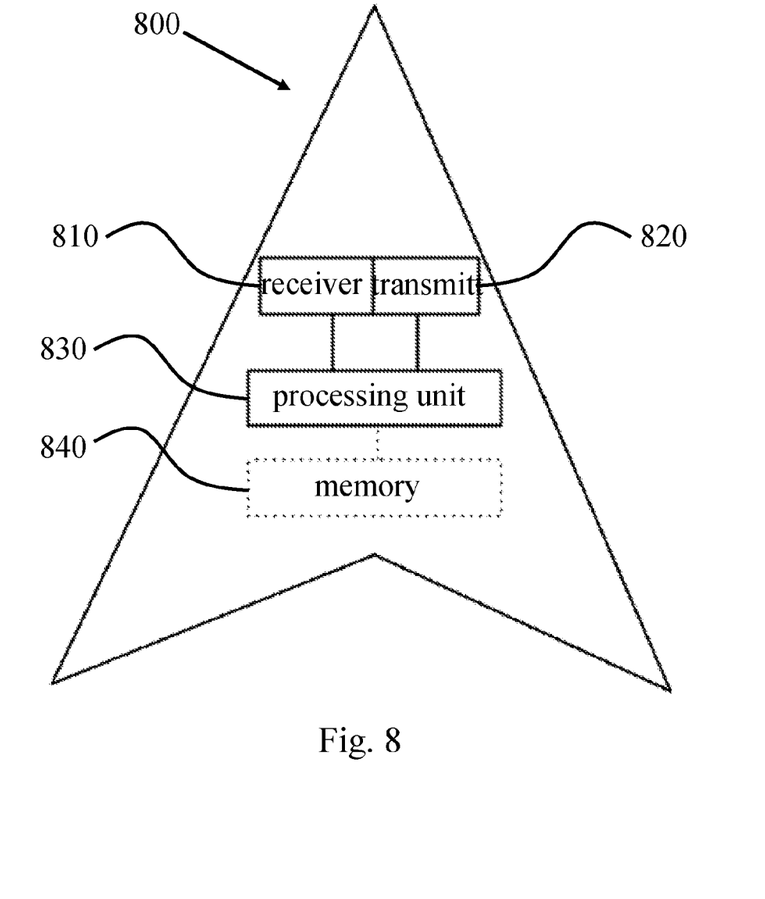
FIG. 8 shows one example embodiment of network node according to the present technology.

Turning now to FIG. 8, a schematic illustration of a network node 800 is shown in the figure. As with the example embodiment of a UE in FIG. 7, the network node 800 comprises a receiving unit 810, a transmitter 820, a processing unit 830 and an optional memory 840 indicated by a dotted line.

It should be pointed out that the network node 800 may be a base station, an NodeB, an eNodeB, a network node controller (BSC) or any other device performing the function of a network node. The reader should also be aware that the exemplary structure of the network node 800 is for illustration purposes only and that the present technology is not limited to this example only.

Using the receiving unit 810, the network node 800 receives signal quality information from one or more UEs (not shown in FIG. 8), where the information is related to one or more beam candidates which may be potentially used by the network node 800 for data transmission to one or more of the UEs, such as the UE in FIG. 7. This signal quality information may be present in different ways, depending on which implementation is preferred.

In one variant, the network node 800 may receive signal quality reports indicating the received signal quality at a UE for a number of beam candidates transmitted by the network node. These signal quality reports may report on the received signal quality for the exact same beam candidates transmitted by the network node 800 to the UE or be a subset of these. If the signal quality report only relates to a subset of the beam candidates transmitted by the network node 800, then the processing unit 830 may use these signal quality values and from these interpolate the possible received signal quality for the remaining beam candidates. So, for example if the network node 800 transmitted on beam candidates 1-8 and only received signal quality information for the beam candidates 1, 3, 5 and 7, the processing unit 830 may calculate the probable downlink signal quality for the beam candidates 2, 4, 6 and 8 through interpolation. Also, it would be possible for the network node 800 via its receiver 810 to receive signal quality reports which report the received signal quality for a different set of beam candidates than the one presently transmitted by the network node 800. The processing unit 830 of the network node 800 would then also use some form of estimate for the actual beam candidates in order to assess the possible received signal quality related to these. However, this will not be described in detail here.

In another variant, the network node 800 may receive signal quality information related to beam candidates where the information is a sounding signal, such as a pilot signal, transmitted by the UE. Measuring on the signal quality of the received pilot signal, the processing unit 830 may then determine the likely downlink performance for a plurality of beam candidates. Collecting signal quality measurements on pilot signals transmitted by the UE transmitted at multiple instances and different times this measurement bay be improved. Also worth mentioning is that the processing unit 830 may also measure on data or control signal transmissions from the UE in order to estimate the likely downlink performance for the plurality of beam candidates.

In addition to the signal quality information related to the beam candidates which may be received or obtained by the network node 800, the processing unit 830 will associate to each beam candidate a factor related to the interference generated by that beam candidate. The factors may either be externally stored in a memory 840 and retrieved by the processing unit 830 or be located in an internal memory (not shown) of the processing unit 830, as desired. The processing unit 830 may then determine the beam candidate according to two example scenarios.

In one scenario, which will be explained more in detail in the example method embodiment in FIG. 9 further down in the text, the processing unit 830 uses the signal quality information received via the receiver 810 and selects only beam candidates as possible candidates for transmission for which the signal quality is above a certain signal quality threshold. On the other hand, the processing unit 830 disregards beams with signal qualities below the threshold value. From the narrowed down selection of possible beam candidates for transmission the processing unit 830 is configured the beam candidate for downlink information transmission which generates the least interference according to the factor associated with it earlier. In another scenario which will be explained more in detail in the example method embodiment in FIG. 9, the processing unit 830 of the network node 800 considers all beam candidates as potentially suitable for downlink information transmission. In this case, after the processing unit 830 via the receiver 810 has received the signal quality information related to a number of beam candidates, it assigns to each beam candidate a factor related to the interference generated by that beam candidate. The processing unit 830 may, as before, retrieve the factors from a memory 840 or from its own internal memory. The processing unit 830 is then configured to select the beam candidate with the best combination of reported or obtained downlink signal quality and generated interference. One way of determining the best combination would be for the processing unit 830 to calculate a performance metric in which the reported or obtained signal quality and the factor related to the interference generated by a beam candidate are two parameters. The processing unit 830 may then, using all or a selected number of beam candidates, determine which beam candidate achieves the best performance metric score, where the score may simply be a scalar value. Here, the best score may be either the highest or the lowest score, depending on implementation.

It should be mentioned that there are other ways of selecting the beam candidate for downlink information transmission and that the present technology is not exclusively limited to the two selection principles described earlier.

For example, in one other variant, the network node 800 may via its processing unit 830 instruct the transmitter 820 to transmit configuration signals to one or more UEs to configure them to issue recommendations on which beam candidate to select for downlink information transmission. More specifically, the processing unit 830 may via the configuration signals instruct the one or more UEs to transmit signal quality information in the form of indices, where each index in the information received has a 1:1 relation to one beam candidate which could potentially be used by the network node 800 for data transmission to a UE. The network node 800 need not be bound by this recommendation and may still select another beam candidate for downlink information transmission. In this variant, the network node 800 need not calculate the performance metric store. Especially when a lot of UEs are present in a cell which the network node 800 is serving or is responsible for, this variant would reduce the computation load on the processing unit 830 dramatically.

It should be mentioned that the processing unit 830 of the network node 800 is configured to assign a larger factor related to beam interference to beams at higher elevation angles according to principles explained in the beginning of the detailed description. The processing unit 830 may also be configured to assign increasing factors to beams above a certain threshold elevation angle and zero factors to all elevation angles below the threshold elevation angle. Moreover, the processing unit 830 may also be configured to assign factors to beams in the azimuth domain, such that beams with an azimuth angle pointing in a certain direction within an angle span where a possible other network node is located, are assigned a higher factor than those outside of this angle span. See the description of the example embodiment in FIG. 9 for details. Alternatively, the processing unit 830 may assign a factor of 0 for those beams whose azimuth angles are outside of the predefined range. Depending on implementation, the processing unit 830 may equally be configured to assign the lowest factor to those beam candidates generating the greatest interference and the highest factor to those generating the least amount of interference.

Also, the factor assigned to each beam candidate by the network node which reflects the interference generated by that candidate may be predetermined and be a function of system parameters, such as current system load, current time of the day, current day of the week. The factor may be independent of which particular UE is being scheduled by the network node at a particular time instance As stated earlier in this technology, there are two effects that influence the system performance: received signal level and experienced interference from non-serving network node:s in the system. Hence, a first embodiment of a method according to the present technology illustrated by the flowchart in FIG. 9 uses this knowledge.

At step 900 of the method performed by a network node, comprises: acquires information on the signal quality associated with a plurality of beam candidates. This information may be obtained/acquired by the network node from the relevant UE by transmitting signals on a plurality of beam candidates and receiving signal quality reports transmitted from the UE to the network node. It should be pointed out that the UE may not necessarily transmit signal quality reports about the exact same beam candidates which have been transmitted by the network node. It may equally relate to a subset of these beam candidates. Thus, if the network node, for example, transmits signals on eight beam candidates, the UE may send a signal quality report for beam candidates 1, 3, 5 and 7. In this case the network node may simply interpolate the assumed signal quality for signals on the remaining four beam candidates. Also, the network node may obtain a signal quality report on a different set of beam candidates from the UE which may be associated with a set of signals transmitted on previous beam candidates. Even in this case, the network node may estimate the possible signal quality for the actual signals transmitted on actual beam candidates.

Another possibility for the network node to obtain information on the signal quality associated with a plurality of beam candidates may be to transmit one or more signals precoded with a beamforming matrix thus resulting in a beam in a certain direction and to receive a pilot signal from the UE. Measuring on the pilot signal received, the network node may estimate the downlink performance for beam candidates.

In this context, information about the path elevation angles may be obtained by letting a network node transmit reference signals with the different beam candidates. However, these reference signals are transmitted with different powers such that more up-tilted signals are transmitted with a lower transmission power and vice versa. The UE may then report back its received power corresponding to each beamforming direction. The above modification will add an extra bias for the system in the quality assessment part; the UE will automatically report a higher receive power for beamforming directions with more down-tilt. Hence, these beamforming directions will be prioritized already at the quality assessment step which in turn may decrease the produced interference during transmission.

Yet another possibility may be for the network node to rely on power measurement offsets that are applied by a UE to the actual measurement. Thereby each reference signal may be transmitted with full power (and thus be received with higher SINR (Signal to Interference and Noise Ratio)), whereas the UE will alter the measured power according to the configured offset. Such an UE-applied offset may be configured in LTE using e.g., the PDSCH-RS-EPRE-Offset (Physical Downlink Share Channel Receive Signal Energy Per Resource Element) parameter which is configured by the network, or the CSI-RS (Channel State Information Received Signal) related parameter Pc in Rel-10: "Pc the assumed ratio of PDSCH EPRE to CSI-RS EPRE when UE derives CSI feedback".

Hence, by configuring a larger power backoff for more uptilted beams, the power backoff becomes the factor related to interference effectively imposing increasing resistance to selecting more uptilted beam candidates. This is particularly useful if the UE is to recommend which effective channel to use (i.e., which beam candidate to use) as is done in the example embodiment in FIG. 10. A particular advantage may be obtained by introducing separate power offsets in the UE for the purpose of recommending an effective channel and for the purpose of reporting CSI. Thus the offset used for the reported CSI may be independently configured and will thus not be negatively impacted by any PMO (present mode) configuration.

One other possibility is to let the network node receive a plurality of reference signals transmitted by the UE and measure the uplink signal quality of these reference signals in order to acquire information related to signal quality for the one or more beam candidates which may be selected for transmission to the UE.

Now, at step 910, the method further comprises, assigning to each of the plurality of beam candidates a factor indicating signal interference generated by the corresponding beam candidate. Hence, the factors reflect the interference generated by each beam candidate and thus introduce a correction to the reported signal quality value related to each beam candidate.

At step 920, the method further comprises, selecting a beam candidate, by taking into account at least the associated measured signal quality and the factor assigned to the selected beam.

There are several ways in which the network node may select the best combination of these two criteria.

In one variant, which we may call hard interference mitigation, the network node selects those beam candidates for possible transmission to the UE which fulfill a predefined criterion. One example of such a criterion may be signal quality threshold. All beam candidates for which the signal quality is measured or determined to be higher than the signal quality threshold are considered as potential candidates for transmission, while the remaining ones are discarded by the network node. The network node assigns to each of the selected beam candidates a factor related to interference generated by the beam candidate. Using prior knowledge of how in the elevation domain more uptilted beams generate more interference the beam candidate with increasing elevation angles will be assigned higher factors. Using this information, the beam candidate with the lowest factor related to interference from the selected group of beam candidates is determined as the candidate for downlink transmission to a UE.

In another variant, which may be called soft interference mitigation, the network node assigns to each beam a quality score of a performance metric based on the corresponding signal quality assessment acquired from, wherein for example an increasing score corresponds to an increased signal quality when using said beam candidate. Also, the network node assigns to each beam candidate a factor relating to the interference generated by the beam candidate. The network node derives then a compensated score for the beam candidate, comprising the quality score with the factor applied. From the list of compensated scores related to each beam candidate, the network node determines the beam candidate with the highest interference compensated score for transmission.

The above performance score metric may also be proportional to estimated received signal power. Moreover, the factor described in this variant may be proportional to received power, so that the compensated score corresponds to an interference compensated received signal power.

On the other hand, the above performance metric may be proportional to estimated data throughput. Moreover, factor related to interference generated by a beam candidate may be proportional to a throughput correction factor, so that the compensated score may correspond to an interference compensated throughput. Soft interference mitigation thus has the advantage that it actively balances the benefit of using a specific beam candidate for a UE, with the disadvantage for other terminals.

Figure 9:
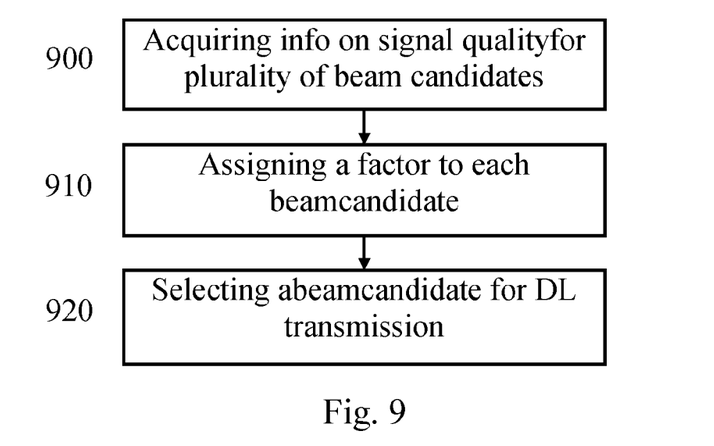
FIG. 9 depicts a flowchart of the method, in a network node, according to exemplary embodiments of the present technology.
Figure 10:
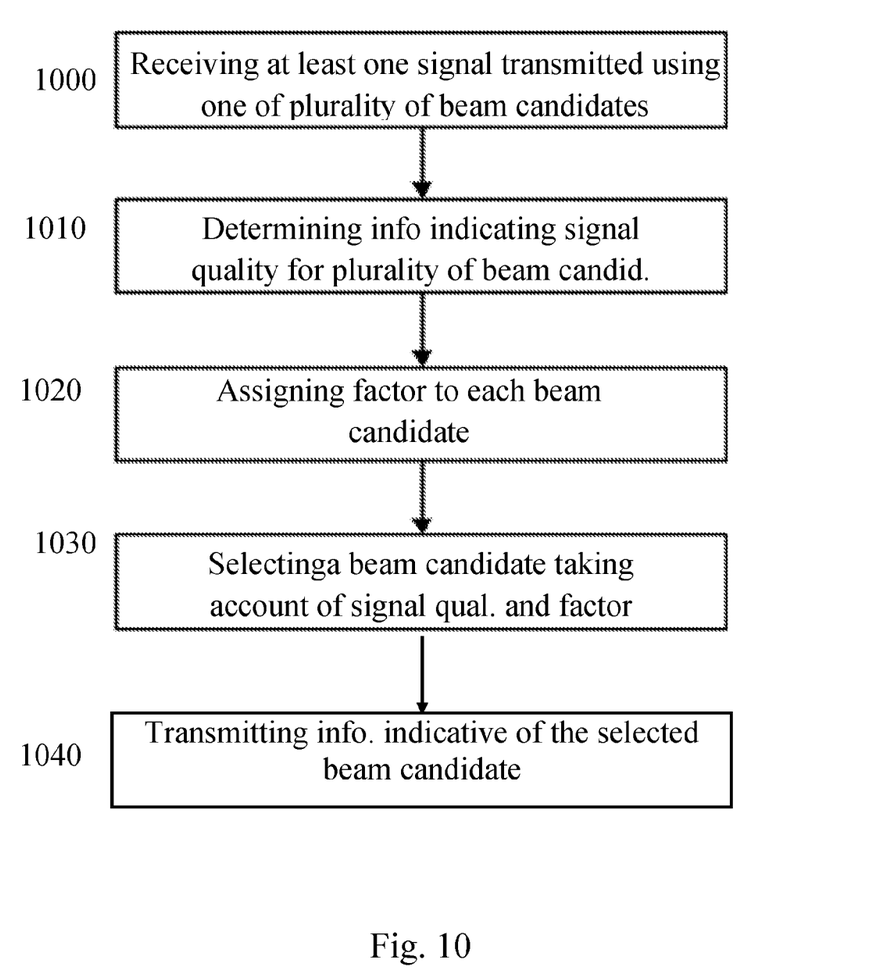
FIG. 10 depicts a flowchart of the method, a an UE, according to exemplary embodiments of the present technology.

Although not displayed in FIG. 9, the network node may use the selected beam candidate for transmission for transmitting information to a UE in the form of data or control signals.

The method and apparatuses presented earlier are for example applicable in urban areas, wherein the radio propagation is typically dominated by one over the rooftop component and one more direct below roof top component.

The above-rooftop component has the strong disadvantage that above rooftop transmissions (close to horizontal) will cause interference that propagates over a very large area (since there are essentially no buildings attenuating the interference). On the other hand, more down-tilted transmissions will have a very limited interference impact on other (distant) UEs since the propagation will be heavily attenuated by buildings.

When targeting urban area deployments, a network node may select from two beam candidates wherein one targets above roof-top transmissions, and the other is strongly down-tilted and targets the below roof-top propagation. The above rooftop beam candidate may then be assigned a significantly larger factor related to interference than the below rooftop beam candidate. However, multiple below-rooftop beam candidates may exist.

Additionally, a network node may take advantage of the fact that a small additional downtilt of a beam typically has a large interference advantage, but only a modest impact on received signal quality at the targeted UE. Hence, by letting the factor related to interference for a specific beam candidate be defined as an additional downtilt, the network may select the best beam candidate by determining the highest corresponding quality assessment, and next determine the beam candidate for transmission by applying the associated additional downtilt to the selected beam candidate. For example, the additional downtilt may correspond to selecting a neighboring further downtilted beam candidate.

FIG. 10 illustrates a second exemplary embodiment of the method performed by a UE e.g. exemplary UE of FIG. 7, according to the present technology.

At step 1000, the method comprises, receiving from a network node, at least one signal transmitted by the network node using one of a plurality of beam candidates. The UE may also receive a plurality of signals transmitted on a plurality of beam candidates, as desired. At step 1010 the method further comprises, determining information which comprises information indicative of signal quality for the one or the plurality of the beam candidates; where the signal quality is related to a link performance for the one or the plurality of beam candidates. This may the downlink performance for each beam candidate. Here, the UE may measure the signal quality associated with each received beam candidate or only with a subset of the beam candidates received. At step 1020 the method further comprises assigning to each beam candidate a factor indicating signal interference generated by the corresponding beam candidate. Now the information on which factor to associate to which beam candidate may be either received at the UE from a network node or be stored in the UE itself. At step 1030, the method comprises, selecting a beam candidate among the plurality of beam candidates as a suggested beam candidate for transmission by taking into account at least the signal quality associated with each beam candidate and the factor assigned to each beam candidate. This the UE may perform by using either hard interference mitigation or soft interference mitigation, as desired and described earlier in the exemplary method in FIG. 9. Note that in this case the roles of the network node and the UE would be interchanged. At step 1040, the method further comprises transmitting to the network node, information comprising information indicative of the selected beam candidate.

The advantage of the exemplary method in FIG. 10 is that due to being implemented in the UE side, it will enable the network to acquire with a minimum of latency and uplink overhead, accurate channel state information (CSI), such as recommended rank indicator (RI), precoder matrix indicator (PMI), and/or channel quality indicator (CQI), for the selected beam candidate.

Figure 11:
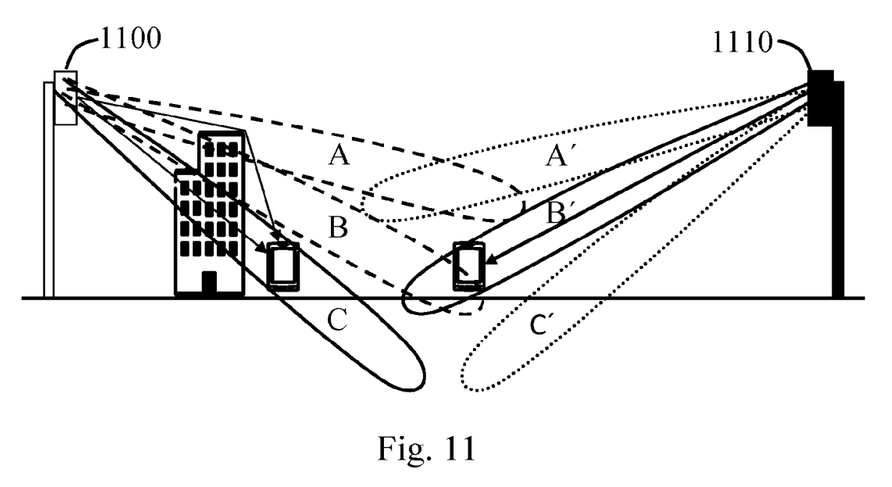
FIG. 11 depicts two network nodes transmitting a signal using dynamic beamforming and minimizing interference.

In the example in FIG. 11 it is illustrated how a network node 1100, 1110 dynamically, using elevation beamforming, may use the proposed method in illustrated in FIG. 9 in order to minimize the interference caused to neighboring cells while ensuring a sufficient level of received power for its UE of interest.

Assume for now that the quality assessment is done by letting all beamforming directions giving a power level within x dB from the highest reported power level be 'primary' candidates for transmission. There are two network nodes 1100 and 1110 present and both of them are able to dynamically perform elevation beamforming in a fixed number of distinct directions. Furthermore, assume that both illustrated network nodes 1100 and 110 are able to obtain information about the expected received power for the different candidate elevation beam candidates A, B, C and A', B' and C', for example using the methods described earlier in the section pertaining to the example method embodiment in FIG. 9. These powers would then constitute a measure on in which beams paths are present.

For the rightmost network node 1110 the second beamforming direction B coincides with the only present path. Therefore, this may be graded as the only primary candidate in the quality assessment. Therefore, assume that the network node 110 determines to transmit in the second beamforming direction B.

For the leftmost network node 1100 there are two paths present. Let us assume that all beamforming directions A, B, C are graded as 'primary' candidates in the quality assessment. The network node will then decide on the beam with the most down tilt and thus select the lowest one C, due to its conducted interference assessment by means of a corresponding factor indicative of the generated interference.

As can be seen in the figure, this decision would result in a good combination of beam candidates for the network nodes 1100, 1110 although there was never any communication between the network nodes. Hence, the interference minimization was done without information about the neighboring cell's beamforming direction.

The presented strategy is expected to be beneficial on average, i.e. in the long run, since down-tilt is prioritized which is beneficial for decreasing interference imposed on neighboring cells.

In the example embodiment in FIG. 11, a hard decision is taken in classifying beam candidates into a group of primary beam candidates from which the beam candidate with least interference impact is chosen. However, the selection process may also use soft interference mitigation in order balance the tradeoff between received power and an interference impact more tightly as is done in a variant of the method step 920 described in the exemplary method embodiment in FIG. 9.

Figure 12:
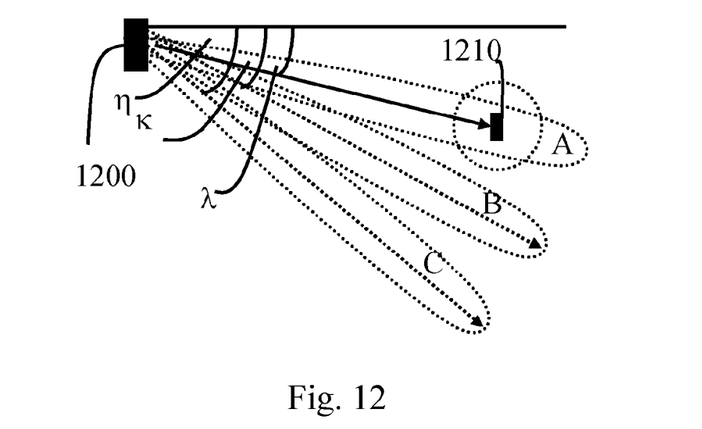
FIG. 12 depicts a network node transmitting a signal on a beam in the azimuth domain creating interference.

In FIG. 12 a macro network node 1200 and a pico network node 1210 are shown. As can be seen, the macro network node 1200 is able to perform dynamic beamforming in the azimuth domain using the beams A, B or C at azimuth angles η, κ and λ, whereas the pico network node 1210 has a fixed beamforming pattern designed for serving UE:s in a area close to the pico network node 1210.

The example method in FIG. 9 could here be applied by designing the factor related to interference so that there is a large factor connected to using beam A. The reason for this is that using beam A likely will interfere UE:s connected to, and thereby close to, the pico network node 1210. Hence, if it in the network node 1200 quality assessment appears as if the beams B or C could be used these may be prioritized before using beam A. This may then cause less interference to the UE:s connected to the pico network node 1210 and thereby increase their performance.

In order for the macro network node 1200 to know where the pico site network node 1210 is located the macro network node 1200 should have the coordinates or a direction of the pico network node 1210 available.

It should be noted that the exemplary embodiments described above are not limited to any specific combination of hardware circuitry and software.

The present technology and its exemplary embodiments may be realized in many ways. For example, an exemplary embodiment includes a computer-readable medium having instructions stored thereon that are executable by a network node and/or a UE. The instructions executable by the network node and/or the UE and stored on a computer-readable medium performing the method steps of the present technology as previously described and as stated in the following claims.

The invention claimed is:

1. A method in a network node for selecting a beam candidate in a wireless communication network, comprising:
   acquiring information indicative of signal qualities for a plurality of beam candidates, the signal quality relating to a link performance for at least one signal;
   assigning to each of the plurality of beam candidates a factor indicating signal interference generated by a corresponding beam candidate, the factor comprising a correction to be applied to the information indicative of signal qualities; and
   selecting a beam candidate for downlink transmission to a user equipment, UE, the selected beam candidate being selected taking into account at least said associated signal quality and the factor assigned to the selected beam candidate, the information indicative of signal quality being mapped to a performance metric and the selecting comprising selecting the beam candidate that has a best performance metric score including the correction.

2. The method of claim 1, further comprising transmitting data to the UE on the selected beam candidate.

3. The method of claim 1, wherein said acquiring is achieved by measuring at least one reference signal transmitted by the UE in a direction towards the network node in an uplink from which the network node estimates said signal quality.

4. The method of claim 1, wherein said acquiring comprises receiving from said UE a measurement report comprising signal qualities for the plurality of beam candidates.

5. The method of claim 1, further comprising transmitting to the UE at least one signal using one of the plurality of beam candidates.

6. The method of claim 5, wherein transmitting the at least one signal comprises transmitting a reference signal precoded with an associated beam candidate.

7. The method of claim 1, wherein the acquiring further comprises the network node configuring the UE to transmit information indicative of signal qualities for a plurality of beam candidates on a plurality of pilot signals.

8. The method of claim 1, wherein the selecting comprises identifying a set of primary beam candidates from the plurality of beam candidates based on corresponding received signal quality and where said selecting further comprises selecting from a set of primary beam candidates, the beam candidate with the factor corresponding to a least generated interference.

9. The method of claim 1, wherein the beam candidate corresponds to beamforming at least one of in an elevation domain and in an azimuth domain.

10. The method of claim 1, wherein the factor associated with a beam candidate is one of a downtilt and an additional downtilt in an elevation domain.

11. The method of claim 1, further comprising the network node informing the UE of the factors corresponding to different interference levels generated by beam candidates.

12. The method of claim 11, wherein the acquiring further comprises configuring the UE to determine an index identifying a recommended beam candidate among a plurality of beam candidates transmitted by the network node by using signal quality assessments for the transmitted beam candidates and the associated factors; and
   the selecting a beam candidate for transmission to the UE is based on said index received from the UE.

13. The method of claim 12, wherein selecting a beam candidate for transmission comprises selecting a beam candidate associated with a reference signal identified by said received index.

14. The method of claim 12, wherein the factor indicating signal interference generated by the corresponding beam candidate is a power measurement offset for an associated reference signal.

15. The method of claim 14, further comprising receiving signal quality information for the reference signal identified by said received index, wherein a separate power measurement offset is configured by the network node for the determining of said signal quality information.

16. The method of claim 1, wherein the factor is one of:
predetermined and is a function of system parameters comprising at least one of current system load, current time of the day and current day of the week; and
independent of which UE is being scheduled by the network node at a time instance.

17. A method in a user equipment, UE, for selecting a beam candidate in a wireless communication system, comprising:
receiving, from a network node, at least one signal transmitted by the network node using one of a plurality of beam candidates;
determining information indicative of signal quality for the plurality of the beam candidates, the signal quality relating to a link performance for said at least one signal; assigning to each beam candidate, a factor indicating signal interference generated by a corresponding beam candidate, the factor comprising a correction to be applied to the information indicative of signal qualities;
selecting a beam candidate among the plurality of beam candidates, the selected beam candidate being selected taking into account at least said associated signal quality and the factor assigned to the selected beam candidate; and
transmitting, to said network node, information indicative of the selected beam candidate, the information indicative of signal quality being mapped to a performance metric and the selecting comprising selecting the beam candidate that has a best performance metric score including the correction.

18. The method of claim 17, wherein information indicative of the selected beam candidate comprises channel state information.

19. A network node for selecting a beam in a wireless communication network, the network node comprising:
a transmitter configured to transmit to a user equipment, UE, at least one signal using a plurality of beam candidates; and
a processing unit configured to:
acquire information comprising information indicative of signal quality for the plurality of the beam candidates; the signal quality relating to a link performance for said at least one transmitted signal;
assign to each beam candidate, a factor indicating signal interference generated by a corresponding beam candidate, the factor comprising a correction to be applied to the information indicative of signal qualities; and
select a beam candidate among the plurality of beam candidates, for downlink transmission to the UE, the selected beam candidate being selected taking into account at least said associated signal quality and the factor assigned to the selected beam candidate, the information indicative of signal quality being mapped to a performance metric and the selecting comprising selecting the beam candidate that has a best performance metric score including the correction.

20. The network node of claim 19, wherein the processing unit further comprises a receiver configured to receive at least one reference signal transmitted by the UE in an uplink in a direction towards the network node; and
the processing unit is further configured to measure on the at least one reference signal transmitted by the UE and to estimate said signal quality from the measurement.

21. The network node of claim 20, wherein the at least one reference signal comprises a signal precoded with an associated beam candidate.

22. The network node of claim 20, wherein the information indicative of signal quality comprises a measurement report from said UE comprising signal quality of the at least one reference signal.

23. The network node of claim 19, wherein the transmitter is configured to transmit a beam candidate using beamforming in at least one of an elevation and azimuth domain.

24. A User equipment, UE, for selecting a beam candidate in a wireless communication system, comprising:
a receiver configured to receive at least one signal on one of a plurality of beam candidates;
a transmitter;
a processing unit configured to:
determine information comprising information indicative of signal quality for the plurality of beam candidates, the signal quality relating to a link performance for said at least one signal, the information indicative of signal quality being mapped to a performance metric;
assign to each beam candidate a factor indicating signal interference generated by a corresponding beam candidate, the factor comprising a correction to be applied to the information indicative of signal qualities;
determine an index identifying a reference signal associated with a beam candidate by taking into account at least said associated signal quality and the factor assigned to the corresponding beam candidate;
instruct the transmitter to transmit the index to a network node; and
select the beam candidate that has a best performance metric score including the correction.

* * * * *